US012149809B2

(12) United States Patent
Jing et al.

(10) Patent No.: US 12,149,809 B2
(45) Date of Patent: Nov. 19, 2024

(54) CAMERA MODULE AND ELECTRONIC DEVICE HAVING THE SAME

(71) Applicant: TRIPLE WIN TECHNOLOGY (SHENZHEN) CO. LTD., Shenzhen (CN)

(72) Inventors: Zhuang-Zhuang Jing, Tianjin (CN); Shin-Wen Chen, New Taipei (TW); Jing-Wei Li, Guangdong (CN); Shuai-Peng Li, Shenzhen (CN); Cong Cao, Jin Cheng (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 125 days.

(21) Appl. No.: 17/979,159

(22) Filed: Nov. 2, 2022

(65) Prior Publication Data

US 2024/0073502 A1    Feb. 29, 2024

(30) Foreign Application Priority Data

Aug. 31, 2022  (CN) .......................... 202211059042.3

(51) Int. Cl.
*H04N 23/54*     (2023.01)
*G03B 5/00*      (2021.01)
*H04N 23/68*     (2023.01)

(52) U.S. Cl.
CPC .............. *H04N 23/54* (2023.01); *G03B 5/00* (2013.01); *H04N 23/687* (2023.01); *G03B 2205/0069* (2013.01)

(58) Field of Classification Search
CPC ...... H04N 23/54; H04N 23/687; H04N 23/00; H04N 23/57; H04N 5/225; H04N 5/2252; H04N 5/2253; H04N 17/002; G03B 5/00; G03B 2205/0069; G03B 3/04; G03B 2205/0076; G02B 5/283; G02B 7/02; G02B 5/28; G02B 7/00; G02B 7/04; G02B 21/36; G02B 7/021; G02B 7/022; G02B 7/025
USPC ...................................... 348/208.7
See application file for complete search history.

(56) References Cited

U.S. PATENT DOCUMENTS

| 8,982,274 B2 * | 3/2015 | Kang ........................ G03B 5/00 |
| | | 348/374 |
| 11,539,867 B2 * | 12/2022 | Song ..................... H04N 23/687 |
| 2015/0135703 A1 * | 5/2015 | Eddington ........... G02B 27/646 |
| | | 60/528 |
| 2019/0136839 A1 * | 5/2019 | Miller ....................... F03G 7/06 |
| 2022/0247931 A1 * | 8/2022 | Mahmoudzadeh ........................ |
| | | H02K 41/0356 |

FOREIGN PATENT DOCUMENTS

CN            217283130         8/2022

* cited by examiner

*Primary Examiner* — Lin Ye
*Assistant Examiner* — Chan T Nguyen
(74) *Attorney, Agent, or Firm* — ScienBiziP, P.C.

(57) ABSTRACT

A camera module comprises a supporting member for supporting a sensor chip to move relative to a lens for correcting camera shake, a plurality of bulges is provided between the supporting member and a bottom plate. The bulges provide a reduced resistance to sliding on the supporting member. An electronic device using the module is also disclosed.

18 Claims, 6 Drawing Sheets

CAMERA MODULE AND ELECTRONIC DEVICE HAVING THE SAME

CROSS-REFERENCE TO RELATED APPLICATION

This application claims priority to China Application No. 202211059042.3, having a filing date of Aug. 31, 2022, filed in China State Intellectual Property Administration, the entire contents of which are hereby incorporate by reference.

FIELD

The subject matter relates to optical devices, and more particularly, to a camera module and an electronic device having the camera module.

BACKGROUND

A camera system usually comprises an anti-shake image correction unit which moves a sensor chip relative to a back plate by a motor for correcting shaking of the camera system. The anti-shake image correction unit generally comprises a supporting member allowing the sensor chip to slide relative to the back plate. However, existing supporting members have complicated structure or cannot provide a sufficiently small resistance for the sensor chip to work effectively.

Therefore, there is room for improvement within the art.

SUMMARY

An objective of the present disclosure is achieved by providing a camera module comprising a supporting member with a simplified structure and an electronic device having the camera module.

An aspect of the present disclosure provides a camera module including a printed circuit board (PCB), a sensor chip, a driving assembly, a housing, a lens, a voice coil motor (VCM), and a plurality of bulges. The PCB comprises a first circuit board, a second circuit board, and a wire assembly, the first circuit board defines a rectangular through hole for receiving the second circuit board, a gap is formed to space the second circuit board from the first circuit board, the wire assembly is positioned in the gap for providing an electrical connection between the first circuit board and the second circuit board; the sensor chip is mounted on the second circuit board; the driving assembly comprises a transmission member and a shape memory alloy wire, the shape memory alloy wire is mounted on the first circuit board and is electronically connected to the first circuit board, the transmission member provides an electronical connection between the transmission member and the second circuit board. The shape memory alloy wire can drive the second circuit board and the sensor chip thereon to move in a plane of the printed circuit board; the housing comprises an upper plate, a bottom plate, and a supporting member, the upper plate and the bottom plate are mounted on either side of the first circuit board for sandwiching the printed circuit board, and the second circuit board is slidably supported on the bottom plate by the supporting member; the VCM is mounted on the upper plate and is configured for receiving and driving the lens; the plurality of bulges are arranged on the bottom plate/the supporting member, the plurality of bulges protruding from the bottom plate/the supporting member to the supporting member/the bottom plate and provide contact between the bottom plate and the supporting member.

Alternatively and/or additionally, the plurality of bulges provide a point contact between the bottom plate and the supporting member.

Alternatively and/or additionally, each bulge has a dome structure, the dome structure has an outer hemispherical surface for providing a point contact between the bottom plate and the supporting member.

Alternatively and/or additionally, the plurality of bulges comprise at least three bulges distributed evenly along a circumference of the bottom plate.

Alternatively and/or additionally, each bulge has a height, a difference in the heights of each two bulges is smaller or equal to 0.05 mm.

Alternatively and/or additionally, the supporting member is substantially rectangular, at least four angles of the supporting member are supported by the plurality of bulges.

Alternatively and/or additionally, the plurality of bulges provides a line contact between the bottom plate and the supporting member.

Alternatively and/or additionally, each bulge has a dome structure, the dome structure has a cambered surface for providing a line contact between the bottom plate and the supporting member.

Alternatively and/or additionally, the plurality of bulges comprise at least two bulges in a line perpendicular to a direction of the line contact.

According to a further aspect of the disclosure, an electronic device is provided, the electronic device comprises the camera module abovementioned.

BRIEF DESCRIPTION OF THE DRAWINGS

Implementations of the present technology will now be described, by way of example only, with reference to the attached figures.

DETAILED DESCRIPTION

Figure 1:
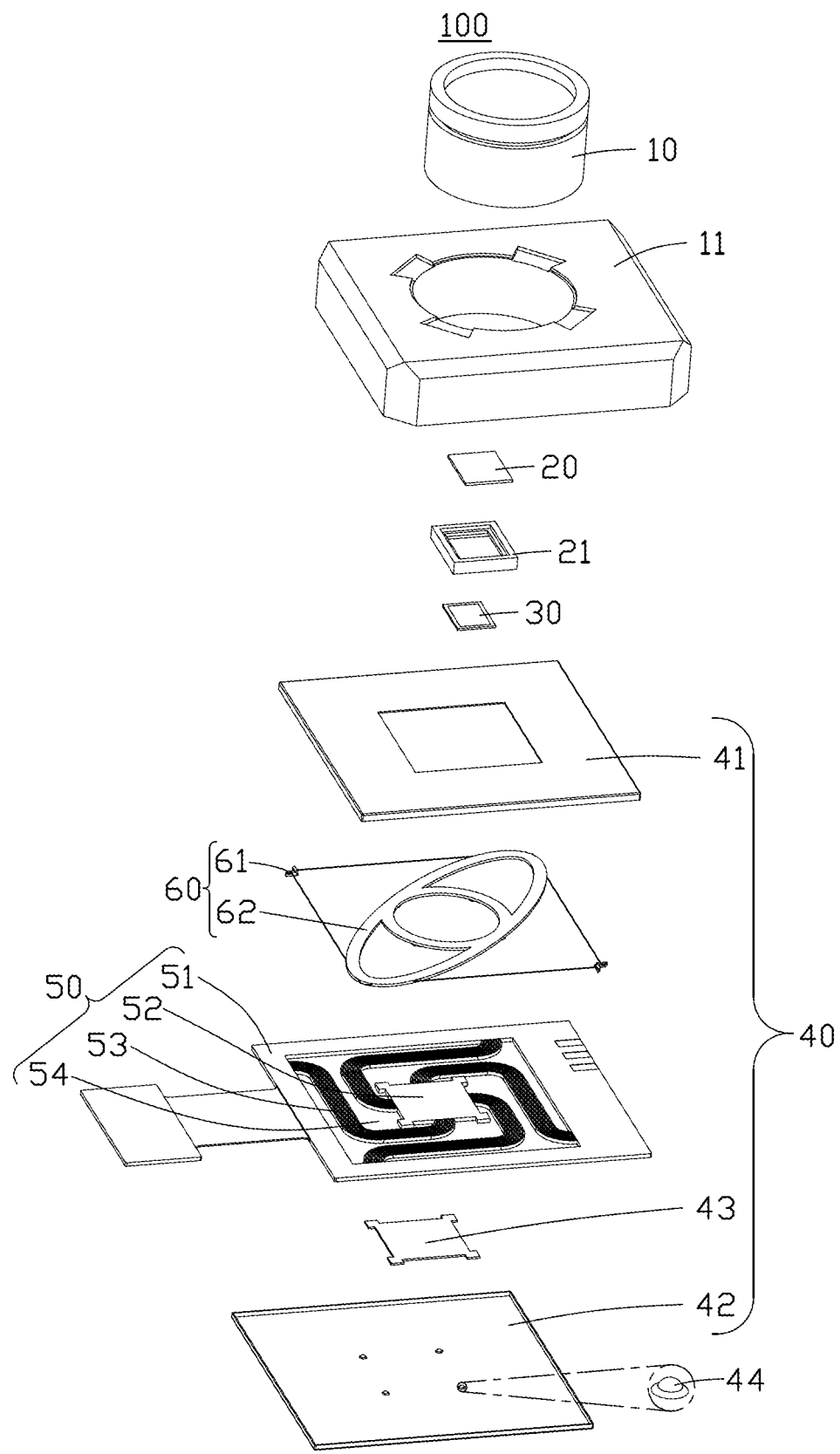
FIG. 1 is an exploded, diagrammatic view of a first embodiment of a camera module according to the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

It should be understood that, the terms "first" and "second" are used to distinguish between elements and are not used to denote a particular order or imply a number of technical features, therefore, unless being specifically defined, features described as "first" and "second" may expressly or implicitly include one or more than one of the stated features. In the description of the present application, "plurality" means two or more, unless otherwise expressly and specifically defined.

In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described.

The term "comprising," when utilized, means "including, but not necessarily limited to"; it specifically indicates open-ended inclusion or membership in the so-described combination, group, series, and the like.

Embodiment 1

Figure 2:
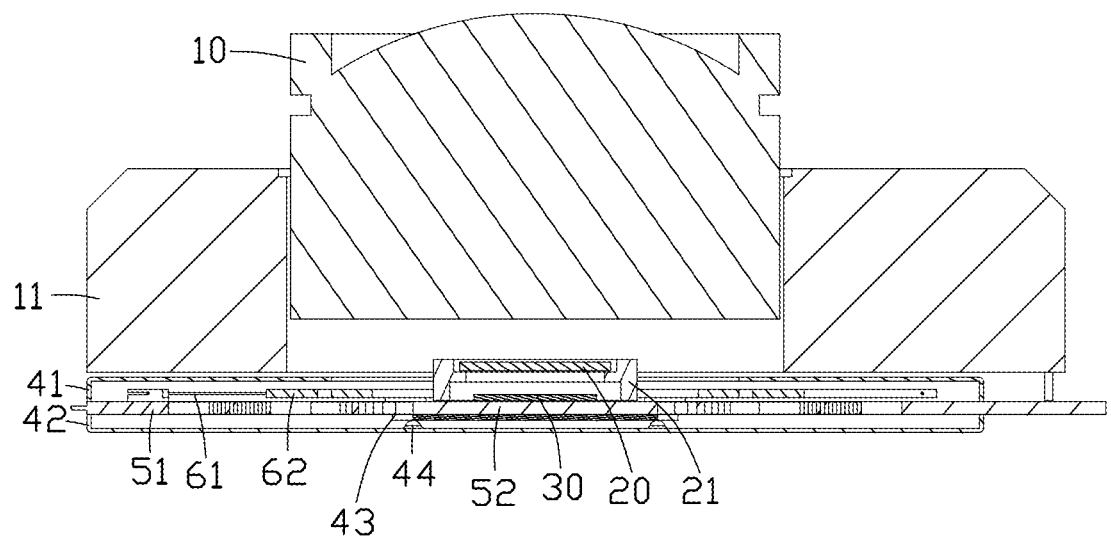
FIG. 2 is a cross-sectional view of the first embodiment in FIG. 1.

FIG. 1 illustrates a first embodiment of a camera module 100. Referring to FIGS. 1 and 2, the camera module 100 includes a lens 10, a voice coil motor (VCM) 11 for receiving and driving the lens 10, a filter 20, a bracket 21 for supporting the filter 20, a sensor chip 30, a housing 40, a printed circuit board (PCB) 50 received in the housing 40, and a driving assembly 60. Specifically, the PCB 50 comprises a first circuit board 51, a second circuit board 52, and a wire assembly 53, the first circuit board 51 defines a rectangular through hole for receiving the second circuit board 52. A gap 54 is formed to space the second circuit board 52 from the first circuit board 51, the wire assembly 53 is positioned in the gap 54 for providing an electrical connection between the first circuit board 51 and the second circuit board 52. The sensor chip 30 is mounted on the second circuit board 52, the driving assembly 60 includes a transmission member 61 and a shape memory alloy wire 62. The shape memory alloy wire 62 is mounted on the first circuit board 52 and is electronically connected to the first circuit board 52. The transmission member 61 provides an electronical connection between the transmission member 61 and the second circuit board 52, which allows the shape memory alloy wire 62 to move the second circuit board 52 and the sensor chip 30 thereon on the plane of the PCB 50. The housing 40 includes an upper plate 41, a bottom plate 42, and a supporting member 43, the upper plate 41 and the bottom plate 42 sandwich the PCB 50, and the second circuit board 52 is slidably supported on the bottom plate 42 by the supporting member 43.

The camera module 100 further includes a plurality of bulges 44 arranged on the bottom plate 42, the bulges 44 protrude out to the supporting member 43 and provide points of contact between the bottom plate 42 and the supporting member 43.

In operation, when an image shaking correction is required, the driving assembly 60 drives the second circuit board 52 to drive the sensor chip 30 thereon to move relative to the bottom plate 42, then the supporting member 43 slides on the bottom plate 42. The bulges 44 formed integrally on the bottom plate 42 provide point contacts between the supporting member 43 and the bottom plate 42 without any extra components, which reduces number of components in the camera module 100 and improves integration of the camera module 100. Further, as the number of components in the camera module 100 is reduced, a manufacturing cost and manufacturing processes of the camera module 100 are also reduced. The point contacts between the supporting member 43 and the bottom plate 42 reduce friction and sliding resistance of the supporting member 43, and the physical resistance of the bulges 44 and an influence of a roughness of the bulges 44 to the resistance are small as a contacting area is small is small as the area of contact is small.

It should be noted that, the bulges 44 in FIG. 1 are illustrated as arranged on the bottom plate 42 and protrude towards the supporting member 43. In further embodiments, the bulges 44 can be arranged on the supporting member 43 and also protrude from the supporting member 43 towards the bottom plate 42.

Referring to FIG. 1 and FIG. 2, according to a further embodiment, each bulge 44 has a dome structure for providing a point contact between the bottom plate 42 and the supporting member 43. Specifically, the dome of each bulge 44 is hemispherical.

Referring to FIG. 1 and FIG. 2, at least three bulges 44 are provided on the bottom plate 42 and are distributed evenly along a circumference of the bottom plate 42. In this embodiment, four bulges 44 are arranged on the bottom plate 42 and supporting the supporting member 30 at four angles of the supporting member 30. Each bulge 44 has a height, a difference in the heights of any two bulges 44 is smaller or equal to 0.05 mm, thus the supporting member 43 can be supported substantially in a horizontal plane, and an accuracy of positioning the supporting member 43 is improved.

Referring to FIG. 2, according to further embodiments, the bulges 44 are formed by stamping, such process requires simple processes, and thus it is suitable for industrial production.

Such configuration provides a point contact between the supporting member 43 and the bottom plate 42 without extra components, which reduces number of components in the camera module 100 and improves degree of integration of the camera module 100, further, as the number of components in the camera module 100 is reduced, a manufacturing cost and process of manufacture of the camera module 100 are also reduced. The point contact between the supporting member 43 and the bottom plate 42 reduces resistance to sliding of the supporting member 43, allowing a smooth sliding for the supporting member 43.

Embodiment 2

Figure 3:
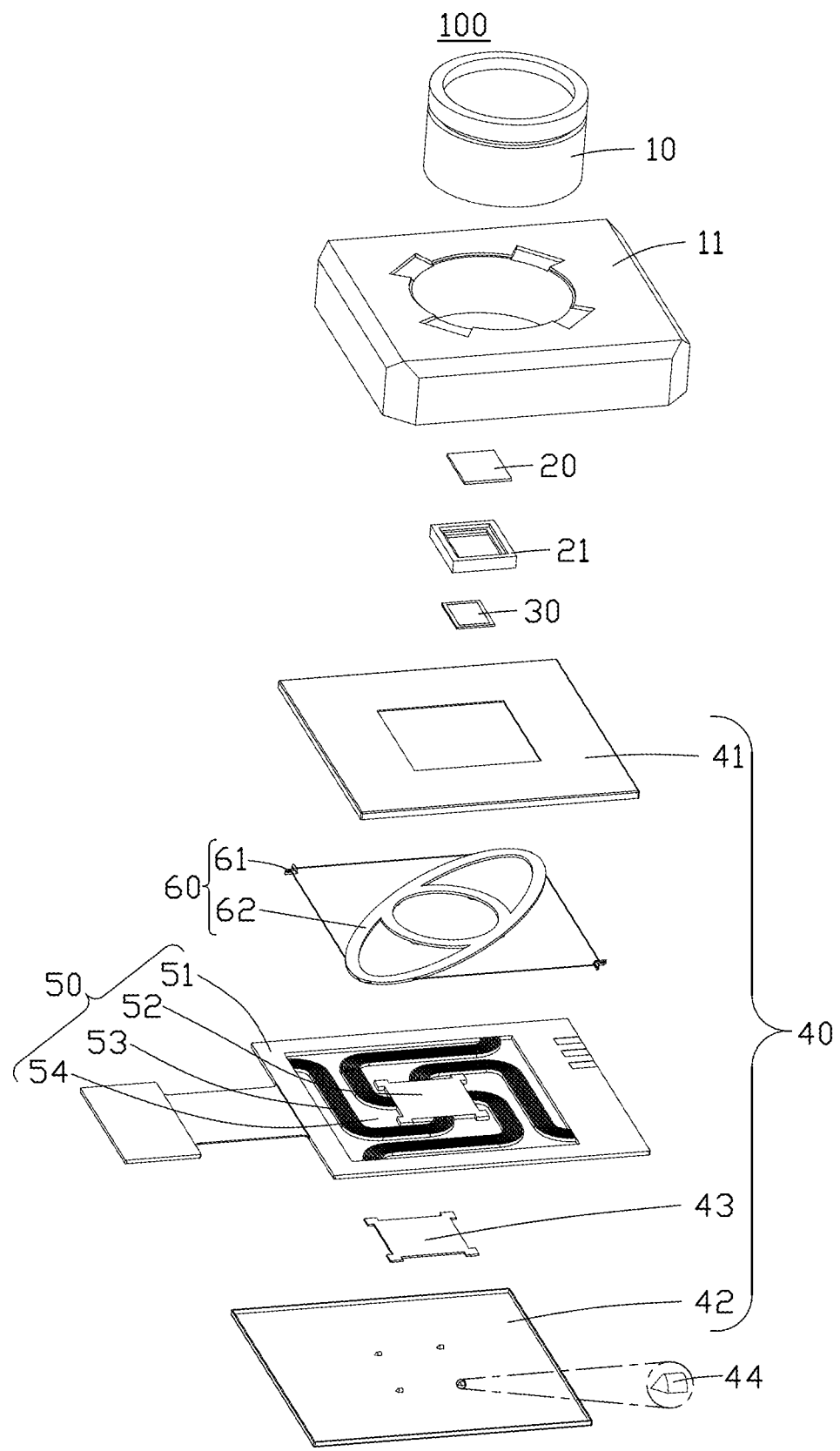
FIG. 3 is an exploded, diagrammatic view of a second embodiment of a camera module according to the present disclosure.

Referring to FIG. 3, a camera module 200 of a second embodiment is provided, the configuration of the camera module 200 is same as that of the camera module 100, except that the dome of each bulge 44 has a cambered surface, then the dome structure provides a line contact between the bottom plate 42 and the supporting member 43, such configuration increases the area of contact between the bottom plate 42 and the supporting member 43 and reduces pressure applied to the bulges 44.

According to a further embodiment, as shown in FIG. 3, the bulges 44 are arranged in a parallel array, that means the bulges 44 are aligned in at least two rows, and each row has at least two bulges 44. For example, in the illustrated embodiment, the bulges 44 are arranged as a 2×2 array and support the supporting member 30 at four angles of the supporting member 30. It should be noted that, with the concept of line contact, the number of the bulges 44 required for balancing the supporting member 43 can be as few as two.

Embodiment 3

Figure 4:
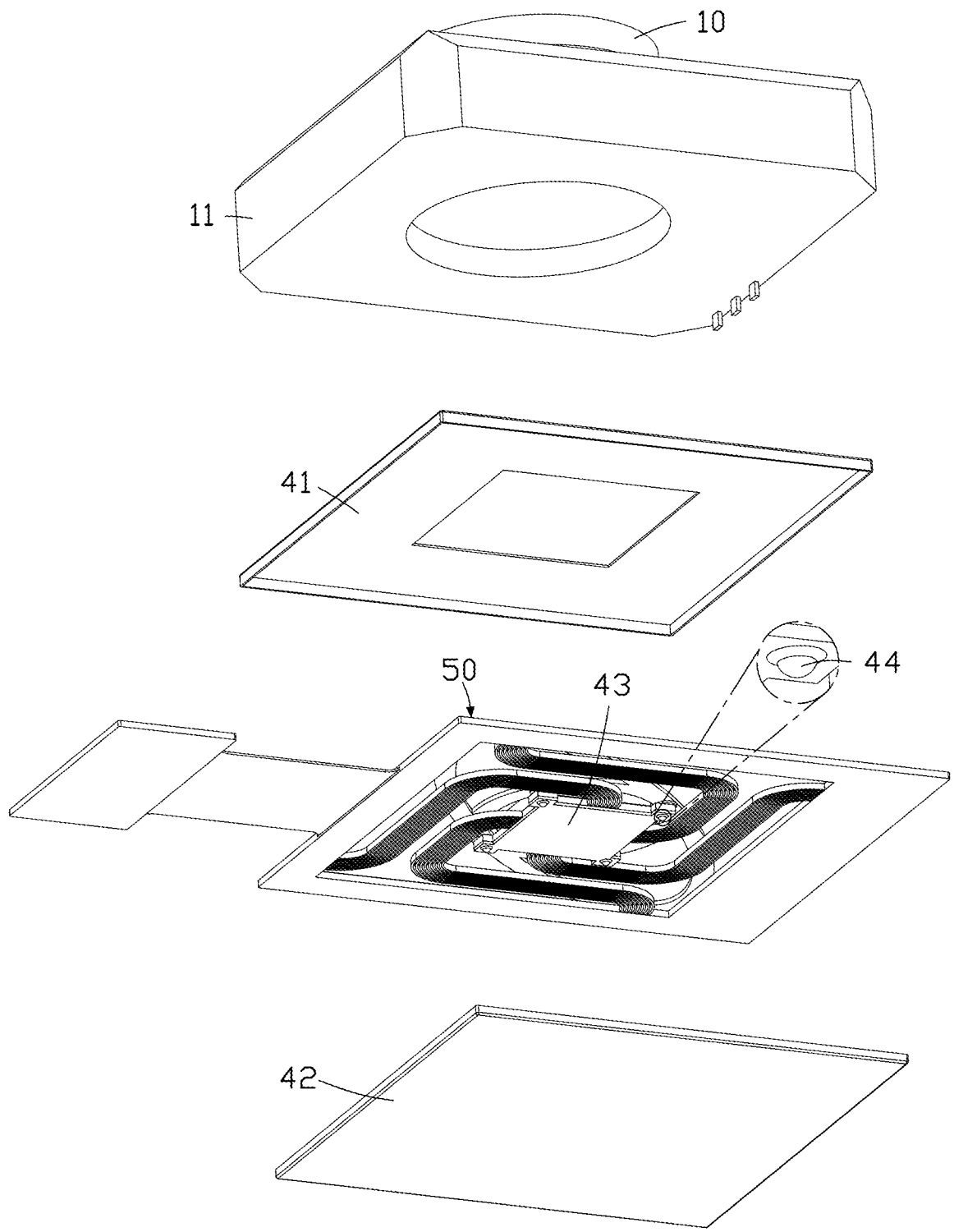
FIG. 4 is an exploded, diagrammatic view of a third embodiment of a camera module according to the present disclosure.

Referring to FIG. 4, a camera module 300 of a third embodiment is provided, the configuration of the camera module 300 is same as that of the camera module 100, except that the bulges 44 are arranged on the supporting member 43 and protrude from the supporting member 43 towards the bottom plate 42, each angle of the supporting member 43 is provided with a bulge 44.

Embodiment 4

Figure 5:
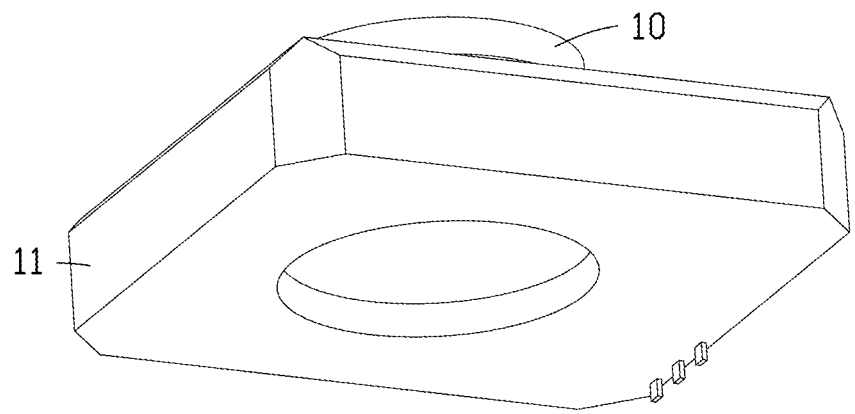
FIG. 5 is an exploded, diagrammatic view of a fourth embodiment of a camera module according to the present disclosure.
Figure 5:
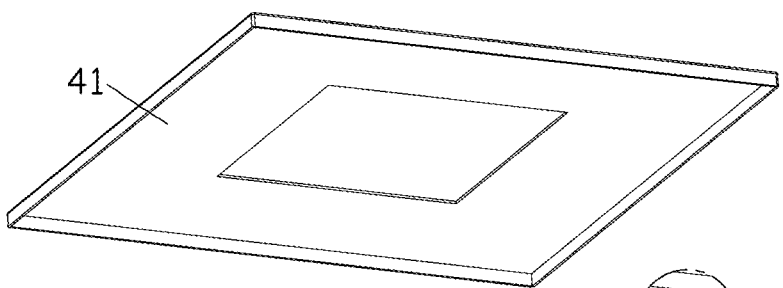
Figure 5:
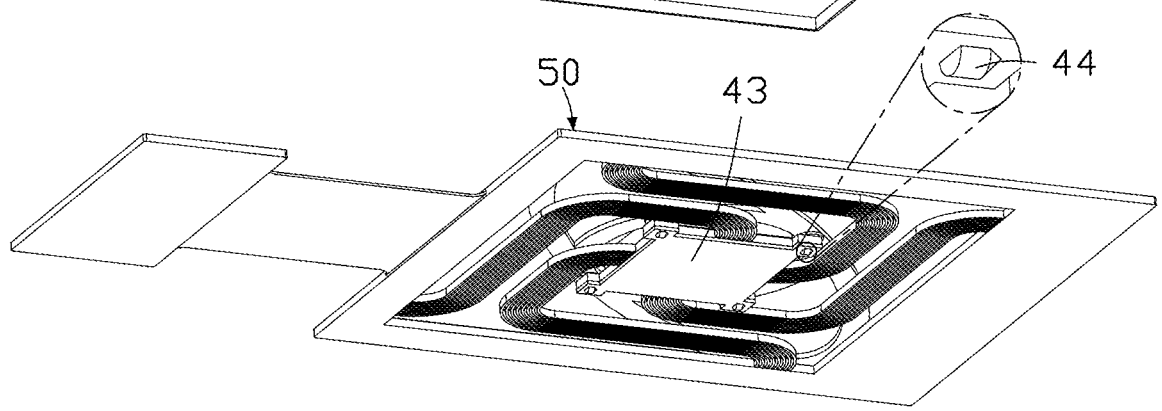
Figure 5:
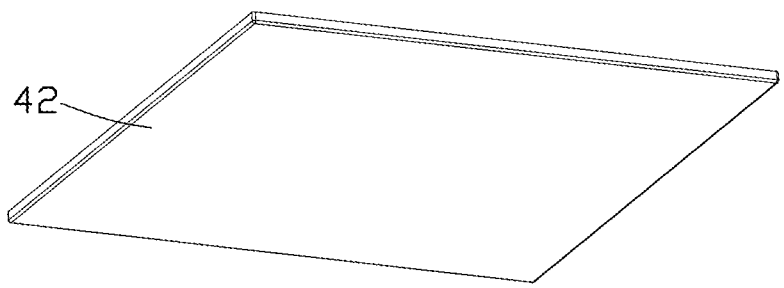

Referring to FIG. 5, a camera module 400 of a fourth embodiment is provided, the configuration of the camera module 400 is same as that of the camera module 200, except that the bulges 44 are arranged on the supporting member 43 and protrude from the supporting member 43 towards the bottom plate 42, each angle of the supporting member 43 being provided with a bulge 44.

Figure 6:
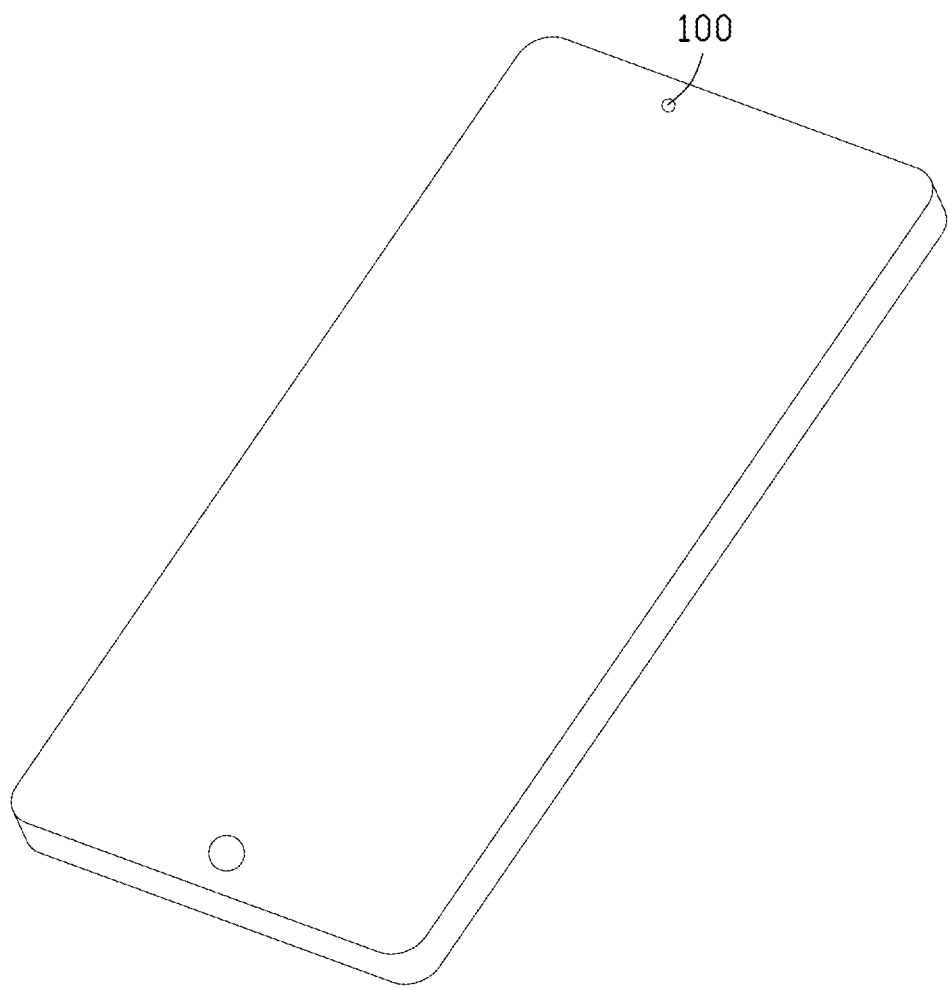
FIG. 6 is a diagram of an embodiment of an electronic device according to the present disclosure.

According to a further embodiment, referring to FIG. 6, an electronic device 500 is also provided. Any of the above camera modules 100-400 is applied to the electronic device 500. The electronic device 500 may be, but not limited to, a mobile phone, a wearable device, a computer device, a vehicle, or a monitoring device. In at least one embodiment, the electronic device 500 is a mobile phone.

While the invention has been described in detail in connection with only a limited number of embodiments, it should be readily understood for the skilled in the art that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A camera module comprising:
    a printed circuit board comprising a first circuit board, a second circuit board, and a wire assembly, wherein the first circuit board defines a rectangular through hole configured for receiving the second circuit board, a gap is formed to space the second circuit board from the first circuit board, the wire assembly is positioned in the gap and provides an electrical connection between the first circuit board and the second circuit board;
    a sensor chip mounted on the second circuit board;
    a driving assembly comprising a transmission member and a shape memory alloy wire, wherein the shape memory alloy wire is mounted on the first circuit board and electronically connected to the first circuit board, the transmission member provides an electronical connection between the transmission member and the second circuit board so that the shape memory alloy wire drives the second circuit board and the sensor chip thereon to move in a plane of the printed circuit board;
    a housing comprising an upper plate, a bottom plate, and a supporting member, wherein the upper plate and the bottom plate are mounted on either side of the first circuit board for sandwiching the printed circuit board, and the second circuit board is slidably supported on the bottom plate by the supporting member;
    a lens;
    a voice coil motor mounted on the upper plate, the voice coil motor being configured for receiving and driving the lens; and
    a plurality of bulges arranged on the bottom plate or the supporting member, the plurality of bulges protruding from the bottom plate or the supporting member to the supporting member or the bottom plate, the plurality of bulges providing contact between the bottom plate and the supporting member.

2. The camera module of claim 1, wherein the plurality of bulges further provide a plurality of point contacts between the bottom plate and the supporting member.

3. The camera module of claim 2, wherein each of the plurality of bulge has a dome structure, the dome structure has an outer hemispherical surface configured for providing one of the plurality of point contacts between the bottom plate and the supporting member.

4. The camera module of claim 2, wherein the plurality of bulges comprise at least three bulges distributed evenly along a circumference of the bottom plate.

5. The camera module of claim 1, wherein each of the plurality of bulges has a height, a difference in the heights of each two of the plurality of bulges is smaller or equal to 0.05 mm.

6. The camera module of claim 1, wherein the supporting member is substantially rectangular, at least four angles of the supporting member are supported by the plurality of bulges.

7. The camera module of claim 1, wherein the plurality of bulges provides a line contact between the bottom plate and the supporting member.

8. The camera module of claim 7, wherein each of the plurality of bulge has a dome structure, the dome structure has a cambered surface configured for providing the line contact between the bottom plate and the supporting member.

9. A camera module of claim 7, wherein the plurality of bulges further comprise at least two bulges in a line perpendicular to a direction of the line contact.

10. An electronic device, comprising a camera module of claim 1.

11. An electronic device of claim 10, wherein the plurality of bulges further provide a plurality of point contacts between the bottom plate and the supporting member.

12. The electronic device of claim 11, wherein each of the plurality of bulge has a dome structure, the dome structure has an outer hemispherical surface configured for providing one of the plurality of point contacts between the bottom plate and the supporting member.

13. The electronic device of claim 11, wherein the plurality of bulges comprise at least three bulges distributed evenly along a circumference of the bottom plate.

14. The electronic device of claim 10, wherein each of the plurality of bulges has a height, a difference in the heights of each two of the plurality of bulges is smaller or equal to 0.05 mm.

15. The electronic device of claim 10, wherein the supporting member is substantially rectangular, at least four angles of the supporting member are supported by the plurality of bulges.

16. The electronic device of claim 10, wherein the plurality of bulges provides a line contact between the bottom plate and the supporting member.

17. The electronic device of claim 16, wherein each of the plurality of bulge has a dome structure, the dome structure has a cambered surface configured for providing the line contact between the bottom plate and the supporting member.

18. The electronic device of claim 16, wherein the plurality of bulges further comprise at least two bulges in a line perpendicular to a direction of the line contact.

* * * * *